J. M. SULLIVAN.
PNEUMATIC CUSHION SUPPORT FOR AUTOMOBILE BODIES.
APPLICATION FILED MAR. 4, 1915.
1,170,942.
Patented Feb. 8, 1916.
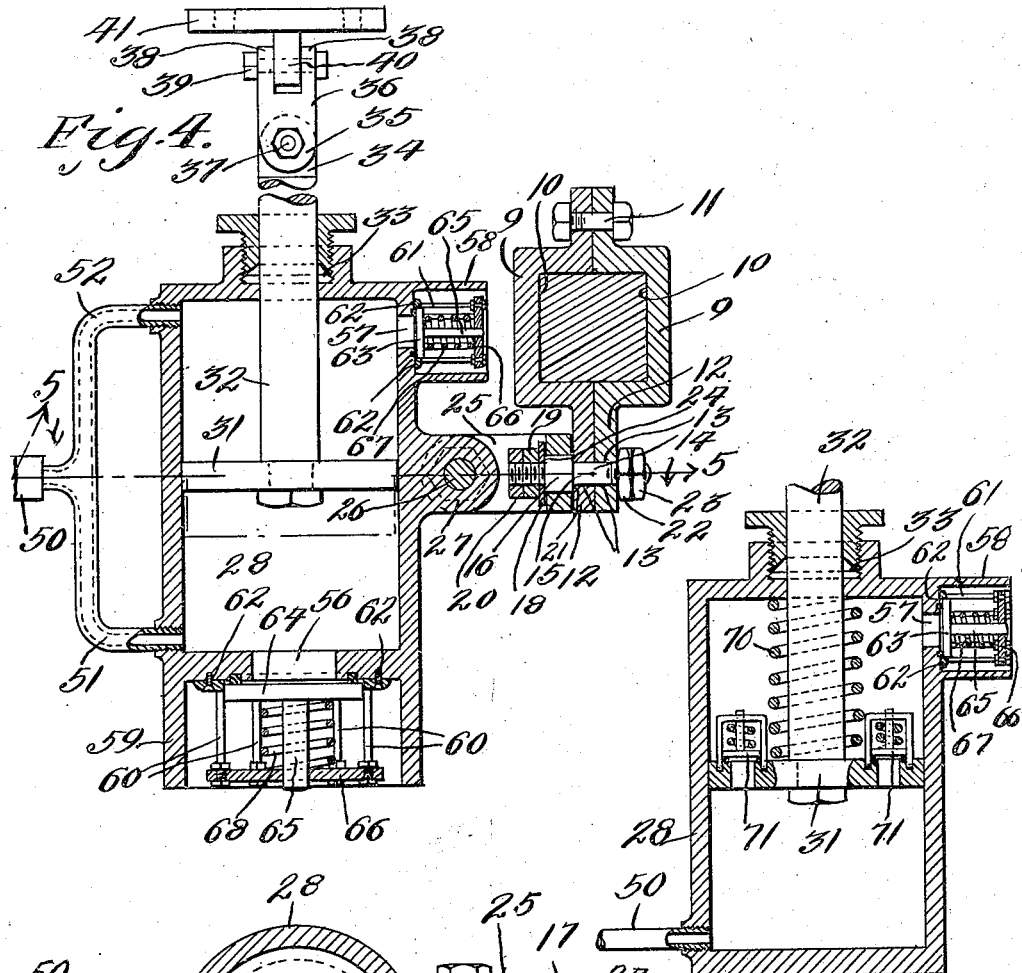

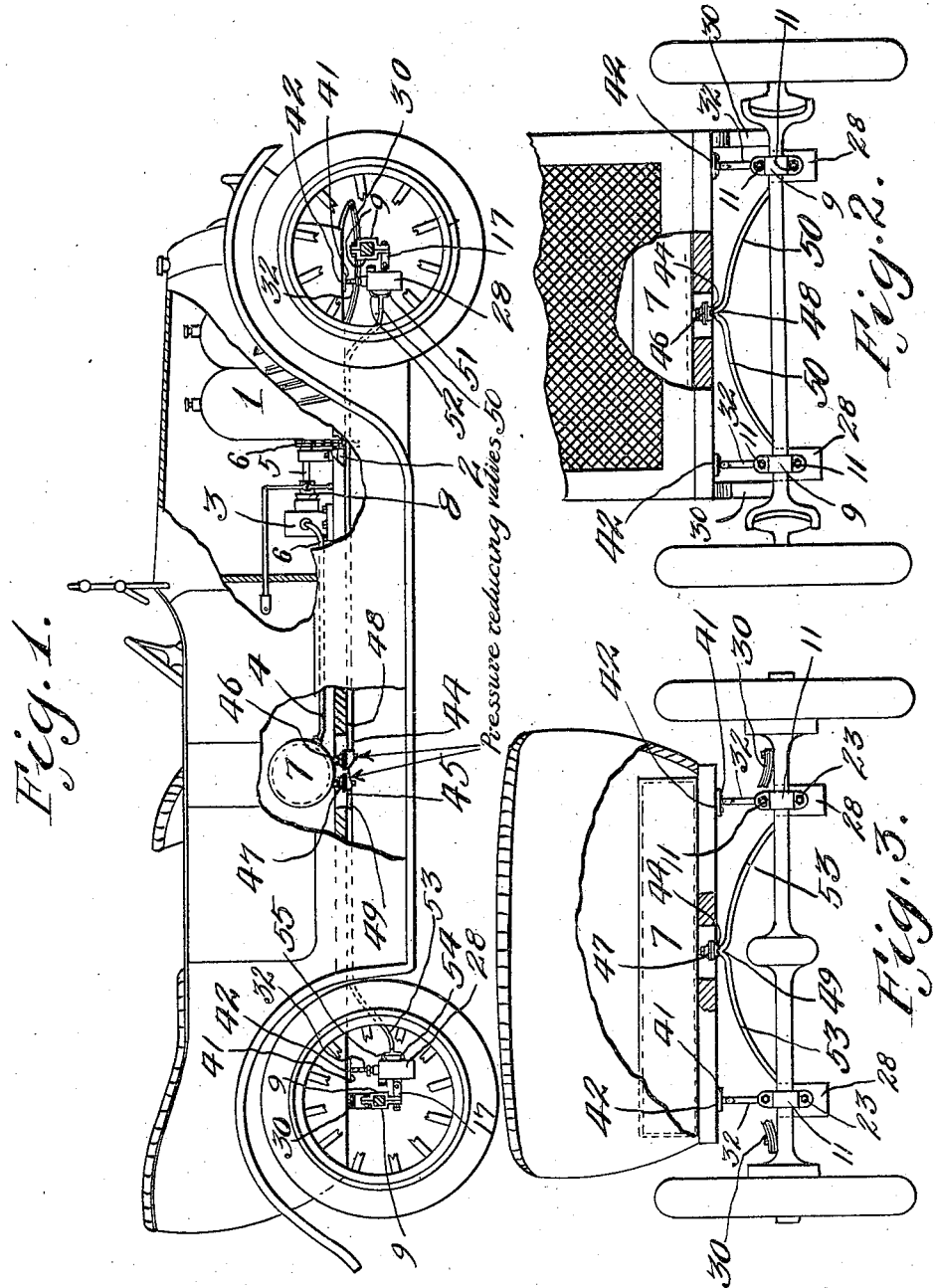

UNITED STATES PATENT OFFICE.

JOSEPH M. SULLIVAN, OF DALLAS, TEXAS.

PNEUMATIC-CUSHION SUPPORT FOR AUTOMOBILE-BODIES.

1,170,942. Specification of Letters Patent. Patented Feb. 8, 1916.

Application filed March 4, 1915. Serial No. 12,162.

*To all whom it may concern:*

Be it known that I, JOSEPH M. SULLIVAN, a citizen of the United States, residing at Dallas, in the county of Dallas and State of Texas, have invented a new and useful Pneumatic-Cushion Support for Automobile-Bodies; and I do hereby declare the following to be a full, clear, and exact description of the invention, such as will enable others skilled in the art to which it appertains to make and use the same.

This invention relates to the art of automobiles and other vehicles, and more especially to an improved pneumatic cushion support between the body of the automobile or other vehicle and the running gear, and an object of the same is to not only produce a device for neutralizing or overcoming the recoil or rebound, but to provide a pneumatic or compressed air support for the body.

Another object of the invention is to provide universal connections between the compressed air cylinders and the forward and rear axles of the running gear, and universal connections between the pistons of said cylinders and the body, in order to permit movement, forwardly, rearwardly and laterally thereby preventing danger of straining the cylinders and their connections with the running gear and the body, which would otherwise occur if said parts were connected more or less rigid.

Another object of the invention is to not only provide a simple, efficient and practical pneumatic support for a vehicle body including air pressure (which is automatically supplied by suitable pumping means connected with the driving shaft of the engine) but to provide a device, which will not only dispense with the use of pneumatic tires, but which will diffuse every shock, no matter how severe, so it can hardly be noticed or felt.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of an automobile, showing four pneumatic cylinders connected universally between the body and the running gear, one adjacent each end of the front and rear axles, and having connections with an air reservoir, which is supplied by suitable pumping means having connections with the crank shaft of the engine. Fig. 2 is a front elevation of the machine. Fig. 3 is a rear elevation. Fig. 4 is an enlarged detail sectional view showing the connections between one of the cylinders and the front axle and the vehicle body. Fig. 5 is a sectional view on line 5—5 of Fig. 4. Fig. 6 is a sectional view through another form of pneumatic cylinder.

Referring more especially to the drawings, 1 designates the usual form of automobile engine, to the crank shaft 2 of which a conventional form of pump 3 has connections 4 and 5, whereby as the engine is in action, the pump is automatically operated. The pump 3 has suitable pipe connections 6 with an air reservoir 7. The connections between the pump and the crank shaft include clutch means 8, whereby the pump may be thrown out of gear with the crank shaft.

Fitting and secured to each end of the forward and rear axle are angular plates 9, the bearing surfaces 10 of which may be any suitable shape, in order to fit different shapes of axles. However, in the present case the axles are shown rectangular. The upper ears of the plates 9 are bolted together by the bolts 11. The lower ears 12 are provided with registering apertures 13, which receive a reduced portion 14 of the bolt 15, and swiveled upon the enlarged cylindrical part 16 of each bolt 15 is a U-shaped bracket 17, there being a washer 18 and a nut 19 to hold the bracket 17 in place, including a lock nut 20, to prevent displacement of the nut 19 and the washer 18. The shoulder 21 formed owing to the provision of the enlarged cylindrical portion 16 of the bolt 15 engages one of the faces of one of the lower ears 12, whereas the nut 22 threaded upon the end of the bolt 15 opposite the enlarged portion 16, bears against the outer face of the other lower ear 12, thereby clamping the lower ears together securely.

The lock nut 23 prevents displacement of the nut 22. In order to permit free swivel movements of the U-shaped bracket 17, the washer 18 is clamped in contact with the shoulder 24, which is formed owing to the provision of the enlarged cylindrical part 16 of the bolt 15. Extending transversely of the ears 25 of the U-shaped bracket 17 is a bearing bolt 26, on which the ear 27, which is is an integral part of the casing 28 of the pneumatic cylinder, is pivoted. As will be noted each cylinder 28 is connected to each end of the forward and rearward axles in a like manner, in order to accommodate the backward and forward as well as the lateral movements of the body. The semi-elliptical springs 30 of the automobile need not be of the usual strength, but of such a character as to merely assist in holding the body in its necessary relative position to the running gear, for it is to be noted that the pneumatic means including the air under pressure is to support the entire weight of the vehicle body.

Mounted in each cylinder casing is a piston 31 having a piston rod 32 operable through a suitable packing gland or box 33. The upper end of the piston rod terminates in an ear 34, which is pivotally connected between the ears 35 of the link 36, as shown at 37. The upper ears 38 of the link 36 are pivoted at 39 to the lug 40 of the circular plate 41, which is bolted at 42 to the under face of the body of the automobile or other vehicle. Each of the pistons is connected to the body in a similar manner, and by such connections together with the connections between the cylinders and the axles, the body is allowed to move forwardly and rearwardly as well as laterally, incident to the machine putting on speed or reducing it, or incident to the machine striking gulleys or any other obstruction in the road.

Extending from the air reservoir are suitable pipes or conduits 44 and 45, which are provided with pressure reducing valves 46 and 47. These pipes 44 and 45 terminate in Y-branches 48 and 49, and each branch 50 of the Y 48 is provided with forks 51 and 52. The forks 51 communicate with the lower portion of the front cylinders below the piston 31, while the forks 52 communicate with the upper portions of the front cylinders above the piston 31, so that in this manner substantially equal pressure of air is above and below the piston. The branches 53 of the Y 49 are also forged as shown at 54 and 55, which are connected to the rear cylinders of the rear axle similar to the connections of the forks of the branches 50. It is to be understood that all the cylinders are of like construction, therefore only one cylinder is described, which comprises an opening 56 in the bottom below the piston 31, and an opening 57 in the cylindrical wall above the piston 31. A cylindrical extension 58 projects laterally from the cylinder and is located adjacent the opening 57. A similar extension 59 projects downwardly from the lower end of the cylinder adjacent the opening 56, and arranged in the extensions 58 and 59 are skeleton frames 60 and 61 secured in place as shown at 62, and guided in the frames are valves 63 and 64, the stems 65 of which are guided in the spiders 66 of said frame, there being heavy strong springs 67 and 68 surrounding the stems, between the valves and the spiders. These springs are of such tension as to substantially correspond to the pressure in the cylinders, so that the valves 63 and 64 will not open under ordinary conditions, such as the machine running over a smooth or even road. However, if the road is rough and the wheels by chance strike a gulley, the cylinders will move downward, and in this case the air above the pistons 31 will be compressed, and the valve 63 will slightly open (which may therefore be termed a relief valve), and the space below the piston 31 will receive more air, and when the cylinder resumes its normal position, or when the wheels and axles resume their normal positions, the cylinders will move upwardly, thereby compressing the air below the pistons 31, causing the pistons 31 to move slightly upwardly, and the valve 56 opening slightly to relieve the pressure to a certain degree, whereas the space above the pistons 31 will receive more air. In other words, the greatest pressure is first transmitted from below the pistons to above the pistons and vice versa. In case the wheels strike an obstruction, the results are practically the same, but in this case the cylinders first move upwardly, therefore the air below the piston is first compressed and at the same time relieved, and when the parts resume their normal positions the greater pressure is above the pistons.

In Fig. 6 another form of cylinder is provided and in which the air pipe only communicates with the lower part of the cylinder, there being a coil spring 70 surrounding the piston rod 32 above the piston, and of substantially equal pressure to the air below the piston. Moreover, in this construction the relief valve at the bottom is dispensed with, and in lieu thereof two small relief valves 71 are employed on the piston. However, in this case the relief valve at the upper portion of the cylinder denoted by the numeral 63 is still used. In the operation of this form of cylinder when the wheels strike an obstruction the cylinder moves upwardly, tending to compress the air below the piston 31, allowing the spring 70 to expand, but at the same time causing the pistons to move slightly upwardly, and also causing the relief valve 71 to partially open, to slightly relieve the pressure, the air passing above the piston and being trapped, thereby in this manner preventing the danger of recoil or rebound. When the wheels resume their normal positions the cylinder moves downwardly, causing the trapped air above the piston to close the relief valve 71.

compressing the spring 70, and allowing the relief valve 63 to open in order that the air above the piston may escape.

The reducing valves 46 and 47 are employed to regulate the air pressure in the cylinders. For example, in case there is 150 pounds of pressure in the air reservoir, the reducing valve shuts it off from the cylinders at any required pressure. By the employment of these forms of cylinders, the body of the automobile is practically wholly pneumatically supported, and at the same time the recoil or rebound is neutralized or overcome.

The inventor is well aware that pneumatic shock absorbers have been provided between the running gear to the vehicle and the body thereof, as disclosed in various citations of patents in this case, and broadly speaking, the inventor does not broadly claim any such construction as disclosed in the patents. He is also well aware that universal connections have been employed in the manner as disclosed in the citations, therefore claims are not drawn in this case to broadly cover the universal connections. However, upon reading this specification and applying the claims to the drawings, it is to be noted that the inventor has devised a special or particular construction of pneumatic shock absorbers between the running gear and the body of the vehicle, which pneumatic shock absorber has particular construction of universal connections with each end of each axle of the vehicle, whereby the cylinders of the shock absorber may move and accommodate themselves to all the vibrations of the body relative to the running gear, incident to the automobile running over rough roads, as specifically defined in the claims.

The invention having been set forth, what is claimed as new and useful is:—

1. In combination with a vehicle body and running gear therefor, a plurality of pneumatic cylinders having universal connections with the running gear, each universal connection between each cylinder and the running gear comprising a pair of bracket plates having upwardly and downwardly extending ears, means for clamping the upwardly extending ears together, a bolt having a cylindrical bearing head midway the ends of said bolt, said bolt beyond one side of the cylindrical head extending through the downwardly extending ears and provided with means to clamp the ears together, a U-shaped plate, the arch of which having an opening to receive the cylindrical head to swivel the U-shaped plate in position, means for holding the U-shaped plate swiveled on the head, said U-shaped plate in turn having pivotal connections to the side of the cylinder, one upon each end of each axle, said cylinders including pistons having their upper portions provided with universal connections to the vehicle-body, an air reservoir having connections with the cylinders including reducing valves, and means having connections with and operated by the engine of the vehicle restoring air in the reservoir.

2. In combination with a vehicle body and a running gear therefor, a plurality of pneumatic pressure cylinders having universal connections with the running gear, one universally connected at each end of each axle, said cylinders including pistons operable therein, the upper ends of which have universal connections with the body, and means of connection between the engine of the vehicle and the cylinders for maintaining air pressure therein, each of the universal connections between the cylinders and the axle comprising bracket plates clamped to the axle, a U-shaped plate swivelly connected to the bracket plates and having a pivotal connection to the cylinder.

3. In improvements in a structure as set forth, a vehicle body, a running gear therefor and pneumatic pressure cushioning means to support the body on the running gear, said pneumatic pressure cushioning means including pneumatic pressure cylinders, said cylinders having universal connections with each end of each axle of the running gear, said universal connection comprising a pair of bracket plates having upper and lower ears, means for clamping the upper ears together, a bolt having a cylindrical bearing head midway the ends of said bolt, said bolt beyond one side of the cylindrical head extending through the lower ears and provided with means to clamp the lower ears together, a U-shaped plate, the arch of which having an opening to receive the cylindrical head to swivel the U-shaped plate in position, means for holding the U-shaped plate swiveled on the head, said U-shaped plate in turn having pivotal connections to the side of the cylinder.

In testimony whereof I have signed my name to this specification in the presence of two subscribing witnesses.

JOSEPH M. SULLIVAN.

Witnesses:
  H. G. ROBERTSON,
  ED. M. PATTERSON.

Copies of this patent may be obtained for five cents each, by addressing the "Commissioner of Patents, Washington, D. C."